United States Patent
Okuyama et al.

[11] Patent Number: 6,088,246
[45] Date of Patent: *Jul. 11, 2000

[54] METHOD OF AND DEVICE FOR CONTROLLING PULSE WIDTH MODULATION INVERTER

[75] Inventors: Miho Okuyama; Masato Koyama, both of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/098,643

[22] Filed: Jun. 17, 1998

[30] Foreign Application Priority Data

Jun. 17, 1997 [JP] Japan ................................ 9-160312

[51] Int. Cl.[7] ........................................ H02M 1/12
[52] U.S. Cl. ................................ 363/41; 363/132
[58] Field of Search ........................ 363/39, 40, 41, 363/95, 98, 132; 318/808, 811

[56] References Cited

U.S. PATENT DOCUMENTS

| | | | |
|---|---|---|---|
| 4,680,526 | 7/1987 | Okuyama et al. | 318/802 |
| 5,343,139 | 8/1994 | Gyugyi et al. | 323/207 |
| 5,450,306 | 9/1995 | Garces et al. | 363/41 |
| 5,625,542 | 4/1997 | Stemmler et al. | 363/41 |
| 5,811,949 | 9/1998 | Garces | 318/448 |

FOREIGN PATENT DOCUMENTS

| | | |
|---|---|---|
| 3107376 | 6/1991 | Japan . |
| 7177753 | 7/1995 | Japan . |

OTHER PUBLICATIONS

Chen et al., "New Method for Analyzing Inverter–Induction Motor System and Optimization of PWM", Aug. 1987, pp. 405–410 Daiyo et al.

"On The Magnetic Noise of an Induction Motor driven by PWM Inverter", Transactions of IEEE Japan, Mar. 1988, pp. 237–244.

*Primary Examiner*—Adolf Deneke Berhane
*Attorney, Agent, or Firm*—Leydig, Voit & Mayer, Ltd.

[57] ABSTRACT

A method of controlling a pulse width modulation or PWM inverter apparatus that generates and controls AC output voltages with PWM control, comprises the steps of: generating a reference voltage vector for setting the AC output voltages; and changing timing of the generation of the AC output voltages during a predetermined period of time determined by a carrier signal at predetermined intervals determined by the carrier signal without changing the pulse widths of the AC output voltages determined by the PWM control so that a vector representing the averages of instantaneous amplitudes of the AC output voltages for a predetermined period of time agrees with the reference voltage vector, and so that the spectra of high-frequency components of each of the AC output voltages are spread out over a predetermined wide range of frequencies.

6 Claims, 15 Drawing Sheets

TIME [SECONDS]

FREQUENCY [kHz]

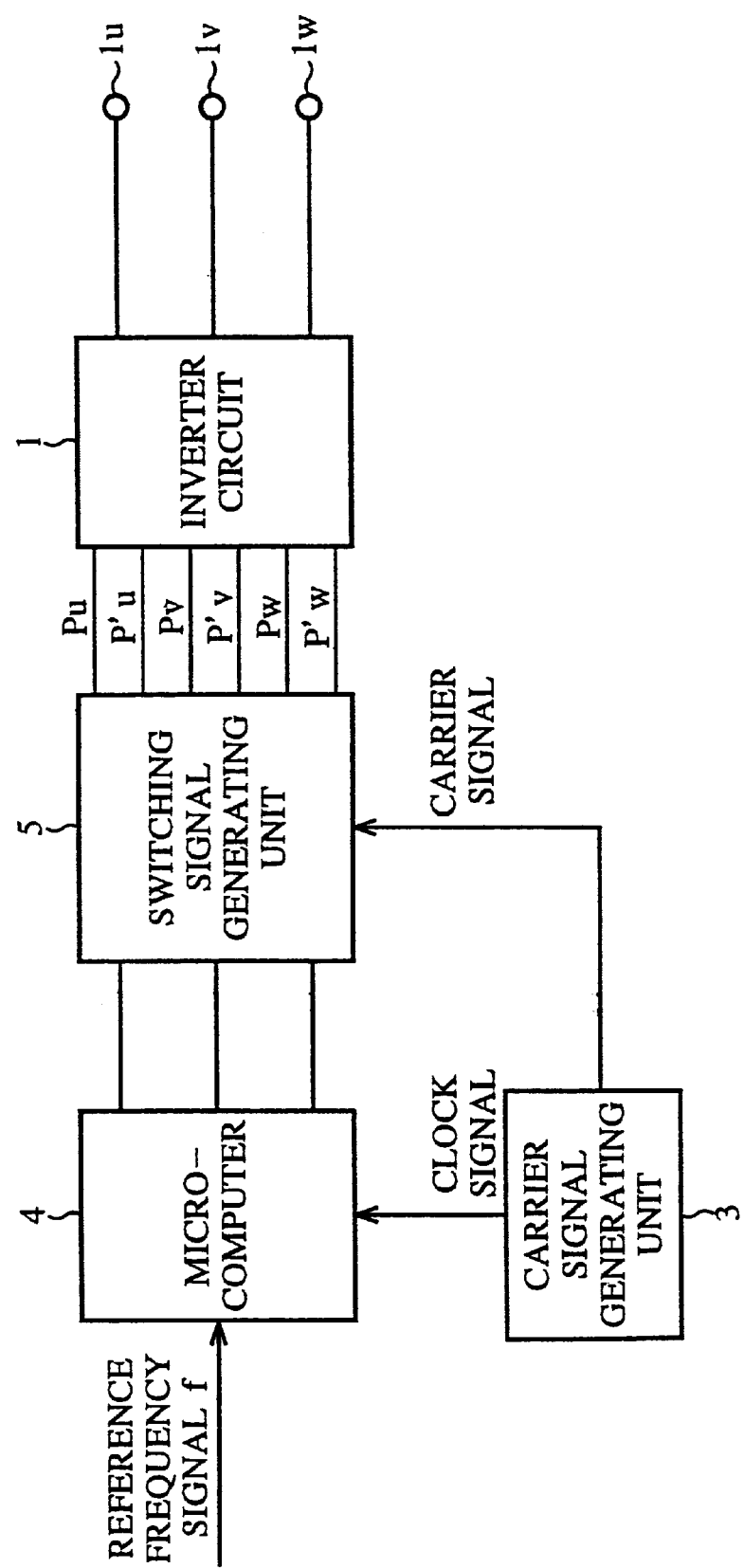

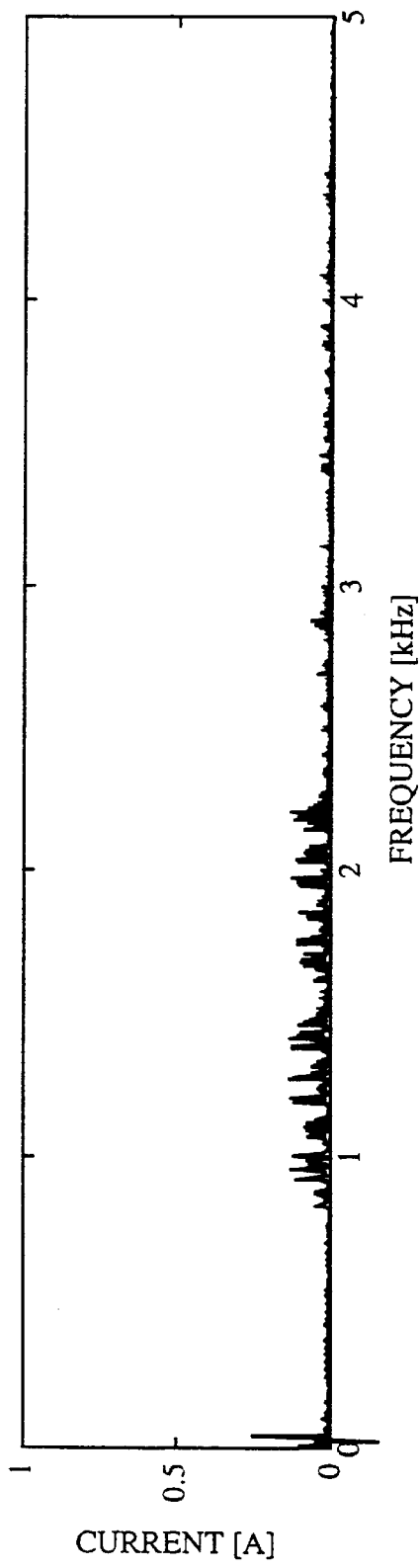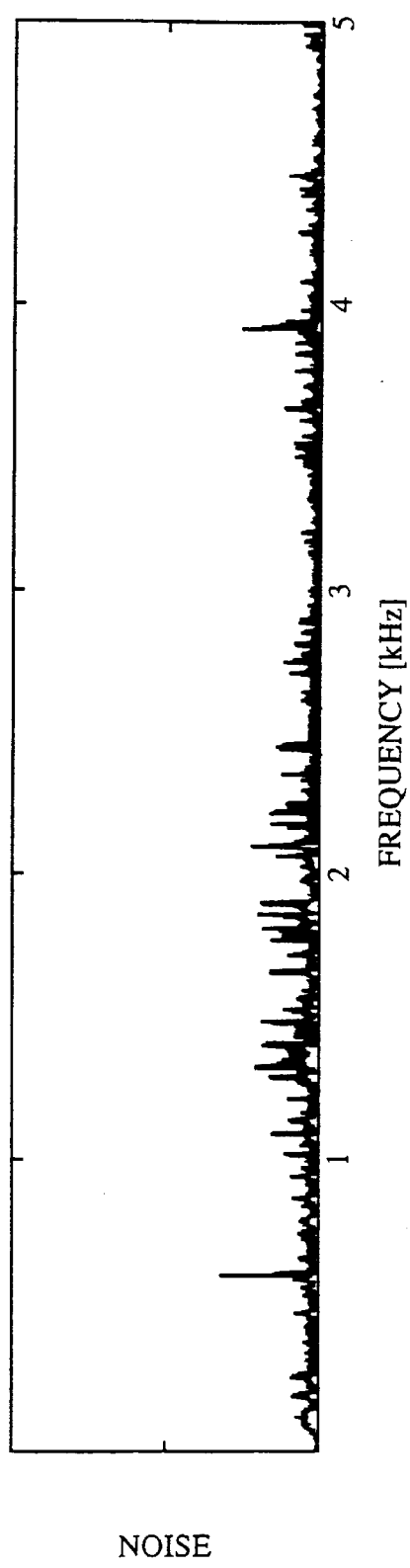

FIG.15 PRIOR ART

|     | (a)   | (b)   | (c)   | (d)   | (e)   | (f)   |
|-----|-------|-------|-------|-------|-------|-------|
| Sa  | b×ta  | Sb+tc | Sc+tb | Sb+tb | Sc+tb | b×ta  |
| Sb  | Sa+tb | b×ta  | b×ta  | Sc+tb | Sa+tb | Sc+tb |
| Sc  | Sb+tc | Sa+tb | Sb+tb | b×ta  | b×ta  | Sa+tc |

METHOD OF AND DEVICE FOR CONTROLLING PULSE WIDTH MODULATION INVERTER

BACKGROUND OF THE INVENTION

1. Field of the Invention

The present invention relates to a method of and a device for controlling a pulse width modulation (PWM) inverter for controlling its output voltages.

2. Description of the Prior Art

When driving an AC motor using a PWM inverter, high-frequency components included in each of the output voltages from the PWM inverter cause a magnetic attraction force and noise which is referred to as electromagnetic noise. Especially, since high-frequency components having the same frequency are continuously applied to the AC motor when the carrier frequency is constant, high electromagnetic noise is generated. In addition, AC motors have a plurality of natural frequencies that depend on their structure. Accordingly, if the output voltages from the PWM inverter include a high-frequency component with a frequency equal to any one of the plurality of natural frequencies of the AC motor which is controlled by the PWM inverter, vibrations generated in the AC motor are increased and the peak level of electromagnetic noise is increased.

To solve the above problem, Japanese Patent Application Laying Open (KOKAI) No. 7-177753 discloses a prior art control apparatus for controlling a PWM inverter. Referring now to FIG. 10, there is illustrated a schematic circuit diagram of the prior art control apparatus. In the figure, reference numeral 1 denotes a three-phase inverter circuit, 2 denotes a reference voltage vector generating unit for generating a reference voltage vector, 3 denotes a carrier signal generating unit for generating a carrier signal, 4 denotes a microcomputer, and 5 denotes a switching signal generating unit for generating a switching signal.

The three-phase inverter circuit 1 is comprised of a plurality of semiconductor switches Su, Sv, Sw, Su', Sv', and Sw', and a plurality of output terminals $1u$, $1v$, and $1w$. Each of the plurality of semiconductor switches is comprised of a self-extinguishing switching element, such as a transistor, and a pair of diodes (not shown) connected in antiparallel to the switching element. The reference voltage vector generating unit 2 is comprised of an A/D converter 21, a ROM 22 for storing a k/f pattern or V/f pattern, a V/F converter 23, and a counter 24. The carrier signal generating unit 3 is comprised of a crystal oscillator 31 and an up/down counter 32. The switching signal generating unit 5 is comprised of comparators 51 to 53 and NOT gates 54 to 56.

Next, a description will be made as to the principle of PWM control of voltage-vector-selection type which the prior art control apparatus employs. Each of the three AC output phase voltages Vu, Vu, and Vw corresponding three phases U, V, and W, which differ in phase and respectively appear at the output terminals $1u$, $1v$, and $1w$, can have any of two possible values, 0 and E, where E represents the voltage of a DC power supply 11 included in the three-phase inverter circuit 1. The switching status of the inverter in the case of Vu=E, Vv=0, and Vw=0 can be designated by a vector (E00). Normalizing this vector with E yields a vector (100), which is referred to as a voltage vector.

Since each of the three AC voltages Vu, Vv, and Vw can have any of two possible values, 0 and E, as previously mentioned, the three-phase inverter 1 can furnish any one of eight (=2×2×2) different voltage vectors. FIG. 11 shows such the eight different voltage vectors. In FIG. 11, the vertexes of the regular hexagon shown represent the voltage vectors V1[=(001)], V3[=(011)], V2[=(010)], V6[=(110)], V4[=(100)], and V5[=(101)], respectively. Each of the remaining two voltage vectors V0[=(000)] and V7[=(111)] whose line voltages are zero is referred to as a zero-voltage vector.

Next, a description will be made as to a method of controlling the output voltages when a reference voltage vector V* is located within a regular triangle having three vertexes defined by the two voltage vectors v4[=(100)] and V6[=(100)], and the zero-voltage vector V0[=(000)] or V7[=(111)], as shown in FIG. 12.

Assume that the reference voltage vector V* has an amplitude or magnitude of k and rotates clockwise at a frequency of ω. In order to make a vector representing the averages of the instantaneous amplitudes of the AC output voltages for a predetermined time period T agree with the reference voltage vector V*, the length of the locus, shaped like a circular arc, at the end of the reference voltage vector V*, has to be the same as that of the locus of the sum of the two voltage vectors V4[=(100)] and V6[=(100)], and the zero-voltage vectors V0[=(000)] and V7[=(111)]. Thus, the following equation (1) is established.

$$1/\sqrt{3} \cdot t4 + 1/\sqrt{3} \cdot \exp(j\pi/3) \cdot t6 = k \cdot \exp(j\theta) \cdot T \qquad (1)$$

where θ=ωt, t4 and t6 represent the time durations of the voltage vectors V4 and V6, respectively. For simplicity, it is assumed that the magnitudes of the voltage vectors V4 and V6, which are measured from the origin shown in FIG. 12, are $1/\sqrt{3}$.

In addition, since the sum of the time durations of those voltage vectors V4 and V6, and zero-voltage vectors V0 and V7 is equal to the predetermined time period T, the following equation (2) is obtained:

$$t4+t6+t0+t7=T \qquad (2)$$

where t0 and t7 represent the time durations of the zero-voltage vectors V0 and V7, respectively, using the equations (1) and (2), the time durations of those voltage vectors V4 and V6, and zero-voltage vectors V0 and V7 are obtained and given by the following equations (3):

$$t4=T\cdot k\cdot \sin(\pi/3-\theta)$$
$$t6=T\cdot k\cdot \sin\theta$$
$$t0+t7=T\cdot\{1-k\cdot\sin(\pi/3+\theta)\} \qquad (3)$$

Accordingly, when the voltage vectors V4, V6, V0, and V7 are sequentially furnished for the time durations given by the above equations (3), the averages of the instantaneous amplitudes of the AC output voltages for the predetermined time period T are equivalent to the three coordinates of the reference voltage vector V*, respectively. Sharing the sum (t0+t7) between the zero-voltage vectors V0 and V7 will be mentioned below.

The above description is directed to pulse width modulation in a case where the phase angle θ of the reference voltage vector V* lies in a phase angle range of 0 to π/3, as shown in FIG. 12. However, varying the selection of two voltage vectors, other than zero-voltage vectors, each time the phase angle of the reference voltage vector V* changes by π/3 can offer a similar control operation even if the phase angle of the reference voltage vector V* lies in the range of π/3 to 2π.

Next, a description will be made to a sequential procedure of selecting two voltage vectors and two zero-voltage vectors with reference to FIG. 13. Two voltage vectors and the two zero-voltage vectors are selected sequentially according to any one of arrows shown in FIG. 13. For example, when the phase angle θ of the reference voltage vector V* lies in the range of 0 to π/3, the selection of those voltage vectors is carried out in the order of V0, V4, V6, and V7 during a predetermined time period T. The voltage vector selection is then carried out in the order of V7, V6, V4, and V0 during the next predetermined time period T. Thus, those voltage vectors V0, V4, V6, and V7 are selected sequentially in the aforementioned orders while the phase angle of the reference voltage vector V* lies in the range of 0 to π/3.

When the phase angle θ of the reference voltage vector v* increases and then shifts to a range of π/3 to 2π/3, another two voltage vectors, V2 and V6, and the two zero-voltage vectors are sequentially selected in the order of V0, V2, V6, V7, V6, V2, and V0 during two predetermined time periods 2T. In the selection sequence of voltage vectors which is carried out in such and order after the phase angle θ of the reference voltage vector V* shifts to the range of π/3 to 2π/3, the replacement of the voltage vector V4 with another voltage vector V2 is simply performed while the selection sequence of the remaining voltage vector V6 and the two zero-voltage voltage vectors is not changed. In addition, since the time durations of the voltage vectors V4 and V2 are almost zero when the phase angle θ of the reference voltage vector V* is π/3 or nearly π/3, as can be seen from FIG. 13, the output voltages do not change suddenly, even though the reference voltage vector V* moves from a phase angle range of π/3 to another adjacent phase angle range of π/3.

Next, a description will be given of a method of sharing the sum (t0 +t7) of the time durations of the two zero-voltage vectors V0 and V7 between them. FIG. 14(a) illustrates an example of the waveforms of output voltages when the time sharing of the sum (t0 +t7) between the two zero-voltage vectors V0 and V7 is maintained throughout all predetermined time periods. On the contrary, FIG. 14(b) illustrates an example of the waveforms of output voltages when the time sharing of the sum (t0 +t7) between the two zero-voltage vectors V0 and V7 is varied at predetermined time periods T. As can be seen from the waveform of a line voltage drawn at the bottom of FIG. 14(b), the average of the line voltage for one time period T is not varied while the interval between the two adjacent line voltage pulses is varied. Varying the time sharing of the sum of the time durations of the zero-voltage vectors between them causes the frequencies of high-frequency components included in each of the AC output voltages, i.e., output line voltages, to vary with time. Sharing the sumτ0=t0+t7 of the time durations of the zero-voltage vectors V0 and V7 between them can be done according to the following equations:

$$t0=\tau 0 \cdot b$$

$$t7=\tau 0 \cdot (1-b) \quad (4)$$

where b is a random number that lies in the range of 0 to 1, and b also represents the value of a time sharing signal for determining the ratio of the time duration of the zero-voltage vector V0 to the sum of the time durations of the zero-voltage vectors V0 and V7.

In operation, the reference voltage vector generating unit 2 accepts and converts an analog reference frequency signal f into an equivalent digital signal by means of the A/D converter 21. When the ROM 22 receives the digital signal from the A/D converter 21, it furnishes a digital signal with a modulation factor of k according to the voltage/frequency pattern or k/f pattern stored therein. The reference frequency signal f is also converted into a series of pulses by the V/F converter 23. The counter 24 counts the series of pulses from the V/F converter 23 and then furnishes a digital signal representing the phase angle θ of a reference voltage vector, which has been obtained by intregating the input reference frequency signal f.

On the other hand, the carrier signal generating unit 3 counts pulses included in a clock signal having a high frequency recieved from the crystal oscillator 31, by means of the up/down counter 32, and then generates a carrier signal having a triangular waveform. Simultaneously, the up/down counter 32 of the carrier signal generating unit 3 generates a clock signal which is synchronous with the time at which the up/down counter 32 switches between its counting up operation and its counting down operation. In other words, the carrier signal generating unit 3 generates a clock signal having a frequency two times as large as that of the carrier signal having a triangular waveform.

The microcomputer 4 carries out arithmetic operations in synchronization with the clock signal from the carrier signal generating unit 3 and then furnishes three reference phase voltage signals Vu*, Vv*, and Vw* as follows: When the microcomputer 4 accepts the modulation factor k and phase angle θ of the reference voltage vector V*, it divides the phase angle θ of the reference voltage vector V* by π/3 and then determines in which triangular region having a π/3 phase angle range, as shown in FIG. 13, the reference voltage vector V* lies according to the quotient of the phase angle θ divided by π/3, first. In other words, assuming that the quotient of the phase angle θ divided by π/3 defines the value of a region determination signal, the region determination signal can have any of six possible values, e.g., any one of the integers 0 to 5, which depends on the phase angle θ of the reference voltage vector V*. The six possible values of the region determination signal correspond to respective triangular regions (a) to (f) as shown in FIG. 13.

The microcomputer 4 then computes the time durations tb and tc of the two selected voltage vectors and the sum ta of the time durations of the two zero-voltage vectors according to the following equations (5) which are similar to the equations (3):

$$ta=T \cdot \{1-k \cdot \sin(\pi/3+\theta)\}$$

$$tb=T \cdot k \cdot \sin(\pi/3-\theta)$$

$$tc=T \cdot k \cdot \sin\theta \quad (5)$$

The value b of the time sharing signal is determined by the execution of a random number generation function or by reading out a number from a table stored in a memory. After that, the microcomputer 4 determines the values of the three reference phase voltage signals Vu*, Vv*, and Vw*, using the value of the region de-termination signal, the time durations of the voltage vectors ta, tb, and tc, and the value b of the time sharing signal according to a relationship or table of FIG. 15 used for determining the timing of generation of the output voltages during one predetermined time period T. The microcomputer 4 then furnishes the reference phase voltage signals Vu*, Vv*, and Vw* to the switching signal generating unit 5.

In FIG. 15, Sa, Sb, and Sc used for determining the timing of generation of the three AC output voltages during one predetermined time period T, correspond to the reference phase voltage signals Vu*, Vv*, and Vw*, respectively. If the reference voltage vector V* lies in the triangular region (a), i.e., the phase angle of the reference voltage vector V* lies in the phase angle range (a) of 0 to $\pi/3$, Sa, Sb, and Sc are given by the following equations by using the time durations ta, tb, and tc and the value of the time sharing signal:

$Sa = b \times ta$ $Sb = Sa + tb$ $Sc = Sb + tc$

If the reference voltage vector V* lies in the triangular region (b), Sa, Sb, and Sc are given by the following equations:

$Sb = b \times ta$ $Sa = Sa + tc$ $Sc = Sa + tb$

Finally, the microcomputer 4 furnishes the reference phase voltage signals Vu*, Vv*, and Vw* to the switching signal generating unit 5 according to Sa, Sb, and Sc.

Referring next to FIG. 16, there is illustrated a graph showing an example of the waveforms of the three reference phase voltage signals Vu*, Vv*, and Vw* computed by the microcomputer, for the modulation factor k=0.8 and the value of the time sharing signal b=0.5.

Using the comparators 51 to 53, the switching signal generating unit 5 compares the amplitudes of the three reference phase voltage signals from the microcomputer 4 and that of the triangular-wave carrier signal from the carrier signal generating unit 3 and then generates and furnishes switching signals to the semiconductor switches Su, Sv, and Sw within the three-phase inverter circuit 1.

When the amplitude of each of the reference phase voltage signals is greater than that of the triangular-wave carrier signal, each of the comparators of the switching signal generating unit 5 generates a switching signal for turning on each of the semiconductor switches Su, Sv, and Sw of the three-phase inverter circuit 1. Each of the NOT gates 54 to 56 inverts the switching signal from each of the comparators so as to turn on or off each of the semiconductor switches Su', Sv', and Sw', so that those switches switch in a reverse way to the other switches Su, Sv, and Sw.

Thus the three-phase inverter circuit 1 furnishes three AC output voltages whose averages of the instantaneous amplitudes for one complete cycle of the clock signal agree with the three coordinates of the reference voltage vector V*, respectively. In addition, since the time durations of the two zero-voltage vectors are varied with time, according the value b of the time sharing signal, the frequencies of high-frequency components included in each of the output voltages are varied at random.

It was expected that the prior art control apparatus for controlling a PWM inverter constructed as mentioned above would spread the spectra of high-frequency components included in each of the AC output voltages over a wide range of frequencies. Hence high-frequency components of constant frequencies would be prevented from being continuously applied to an AC motor that is controlled by the PWM inverter by making the frequencies of high-frequency components of each of the output voltages vary at random, thereby reducing the magnitude of electromagnetic noise.

However, a problem with the prior art control apparatus is that the dispersion of the high-frequency components included in each of the AC output voltages can produce a high-frequency component having the same frequency as any one of the plurality of natural frequencies of the AC motor and therefore cause electromagnetic noise unbearable to users. Especially, if the high-frequency components included in each of the AC output voltages are spread out over a range of frequencies equal to or less than 1 kHz, the AC motor can cause electromagnetic noise whose tone quality varies as if the bearings were worn out. The problem is thus that the tone quality of the electromagnetic noise is reduced and it is therefore difficult to distinguish the electromagnetic noise from noise representing anomalies in the bearings.

SUMMARY OF THE INVENTION

The present invention is made to overcome the above problems. It is therefore an object of the present invention to provide a method of controlling a PWM inverter, capable of improving the tone quality of electromagnetic noise caused by high-frequency components included in each of output voltages by causing the timing of generation of the output voltages to vary with time so that the spectra of the high-frequency components are spread out over a predetermined range of frequencies.

It is another object of the present invention to provide a control device suitable for controlling a PWM inverter of the voltage-vector-selection type and capable of improving the tone quality of electromagnetic noise caused by an AC motor controlled by the PWM inverter control device.

It is a further object of the present invention to provide a control device suitable for controlling a PWM inverter of the triangular-wave-comparison type and capable of improving the tone quality of electromagnetic noise caused by an AC motor which is to be controlled by the PWM inverter control device.

In accordance with one aspect of the present invention, there is provided a method of controlling a pulse width modulation or PWM inverter apparatus that generates and controls AC output voltages with PWM control, comprising the steps of: generating a reference voltage vector for setting the AC output voltages; and changing the timing of generation of the AC output voltages during a predetermined period of time determined by a carrier signal at predetermined intervals determined by the carrier signal without changing the pulse widths of the AC output voltages determined by the PWM control so that a vector representing the averages of instantaneous amplitudes of the AC output voltages for a predetermined period of time agrees with the reference voltage vector, and so that the spectra of high-frequency components of each of the AC output voltages are spread out over a predetermined wide range of frequencies.

Preferably, the method further comprises the step of measuring electromagnetic noise caused by an AC motor connected to and controlled by the PWM inverter while varying the frequency of the carrier signal, and the generation timing changing step is carried out so that the spectra do not include any component of a frequency which is equal to any one of frequencies of noise components included in the electromagnetic noise and caused by natural vibrations of the AC motor.

In accordance with another aspect of the present invention, there is provided a device for controlling a pulse width modulation or PWM inverter including a three-phase inverter circuit, provided with three sets of first and second switching elements connected in series between positive and negative electrodes of a DC power supply and three output terminals each connected to between the first and second switching elements of each of the three sets, for generating three AC output voltages from the DC power supply, the device comprising: a carrier signal generating unit for generating a carrier signal; a reference voltage vector generating unit for generating a reference voltage vector for setting three AC output voltages furnished by the three-phase inverter circuit; a microcomputer for determining in which range of phase angles the phase angle of the reference voltage vector lies at predetermined intervals determined by the carrier signal, for then selecting two voltage vectors corresponding to the determined range of phase angles from among a plurality of predetermined voltage vectors, for computing time durations of the selected two voltage vectors and the sum of time durations of two zero-phase voltage vectors so that a vector representing the averages of instantaneous amplitudes of the three AC output voltages for a predetermined period of time agrees with the reference voltage vector, for computing the ratio of the duration of one of the two zero-phase voltage vectors to the computed sum using a predetermined function of time in such a manner the ratio varies with time so that the spectra of high-frequency components of each of the three AC output voltages are spread out over a predetermined wide range of frequencies, for computing the time durations of the zero-voltage vectors using the computed ratio, and for generating three reference phase voltage signals according to the computed time durations of the two selected voltage vectors and the two zero-phase voltage vectors; and a switching signal generating unit for generating switching signals for driving the three sets of first and second switching elements of the inverter circuit according to the three reference phase voltage signals.

Preferably, the predetermined function of time used for determining the ratio of the time duration of one of the two zero-phase voltage vectors to the computed sum of the time durations of the two zero-phase voltage vectors is a sinusoidal one whose frequency varies with time.

In accordance with another aspect of the present invention, there is provided a device for controlling a pulse width modulation or PWM inverter apparatus that generates and controls AC output voltages with PWM control, the device comprising: a carrier signal generating unit for generating a carrier signal; a microcomputer for generating sine-wave voltage signals with no DC component, for generating a DC voltage signal whose value varies with time, and for respectively adding the DC voltage signal to the sine-wave voltage signals so as to furnish the addition results as reference phase voltage signals for setting the AC output voltages which is to be furnished by PWM inverter apparatus; and a switching signal generating unit, responsive to the carrier signal, for generating switching signals for driving switching elements which correspond to the AC output voltages respectively according to the reference phase voltage signals.

Preferably, the generated DC voltage signal has a value that varies with time according to a sinusoidal signal whose frequency varies with time.

Further objects and advantages of the present invention will be apparent from the following description of the preferred embodiments of the invention as illustrated in the accompanying drawings.

BRIEF DESCRIPTION OF THE DRAWINGS

FIG. 5 is a block diagram showing the structure of a PWM inverter apparatus of the triangular-wave-comparison type according to a second embodiment of the present invention;

FIG. 9(a) is a graph showing a result of an FFT analysis of a primary current of the AC motor of the PWM inverter apparatus according to the third embodiment of the present invention;

FIG. 9(b) is a graph showing a result of an FFT analysis of noise caused by the AC motor of the PWM inverter apparatus according to the third embodiment of the present invention;

FIG. 15 is a table showing the timing of generation of three reference phase voltage signals.

DETAILED DESCRIPTION OF THE PREFERRED EMBODIMENTS

First Embodiment

Figure 1:
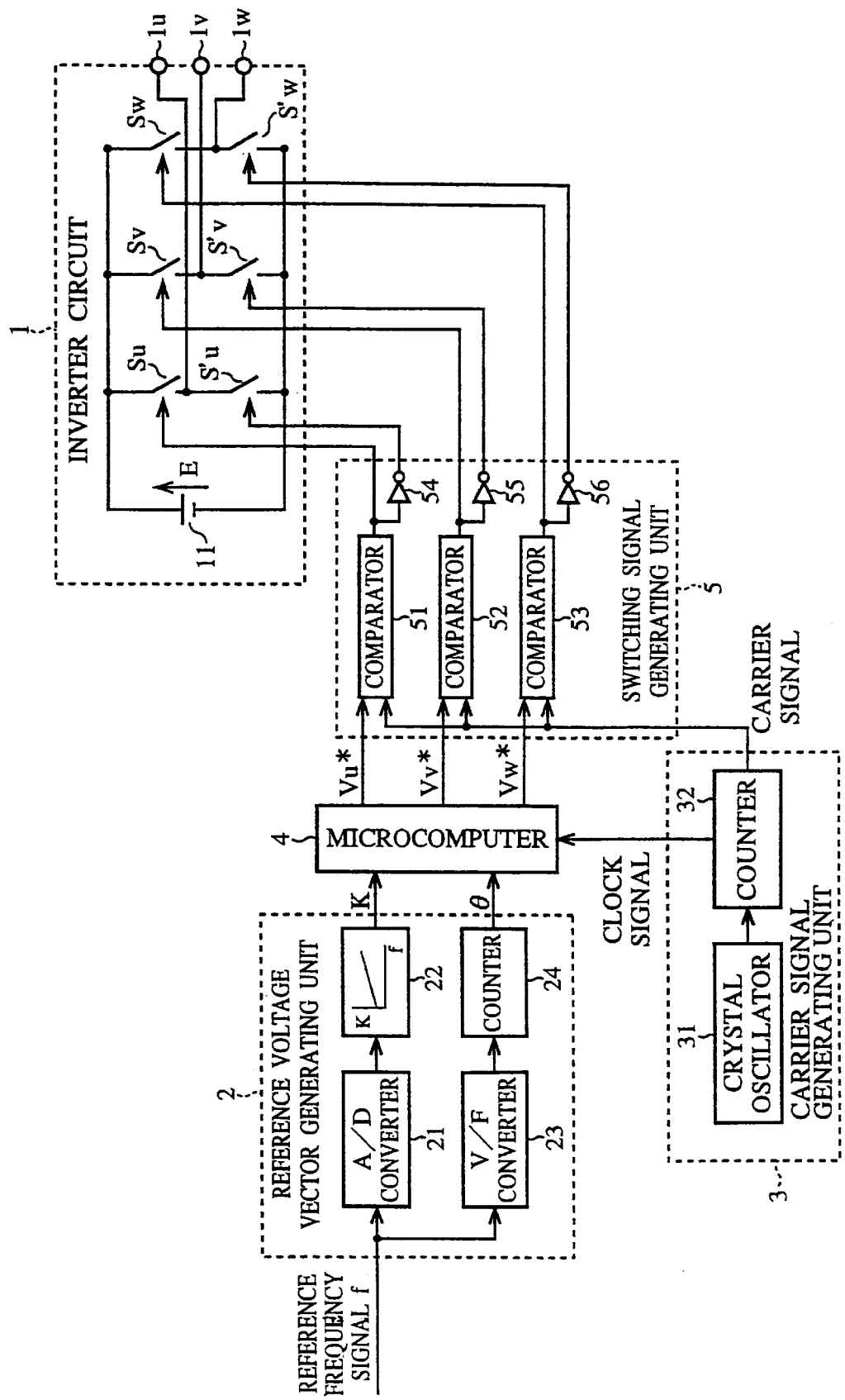
FIG. 1 is a block diagram showing the structure of a PWM inverter apparatus according to a first embodiment of the present invention.

Referring next to FIG. 1, there is illustrated a block diagram showing the structure of a PWM inverter apparatus according to a first embodiment of the present invention. In the figure, reference numeral 1 denotes a three-phase inverter circuit, 2 denotes a reference voltage vector generating unit, 3 denotes a carrier signal generating unit, 4 denotes a microcomputer, and 5 denotes a switching signal generating unit.

The three-phase inverter circuit 1 is comprised of a plurality of semiconductor switches Su, Sv, Sw, Su', Sv', and Sw', and a plurality of output terminals $1u$, $1v$, and $1w$. Each of the plurality of semiconductor switches is comprised of a self-extinguishing switching element such as a transistor and a diode (not shown) reverse-biased and connected in parallel to the switching element. The reference voltage vector generating unit 2 is comprised of an A/D converter 21, a ROM 22 for storing a k/f or V/f pattern, a V/F converter 23, and a counter 24. The reference voltage vector generating unit 2 furnishes a reference voltage vector according to a reference frequency signal from outside. The carrier signal generating unit 3 is comprised of a crystal oscillator 31 and an up/down counter 32. The switching signal generating unit 5 is comprised of comparators 51 to 53 and NOT gates 54 to 56.

Figure 2A:
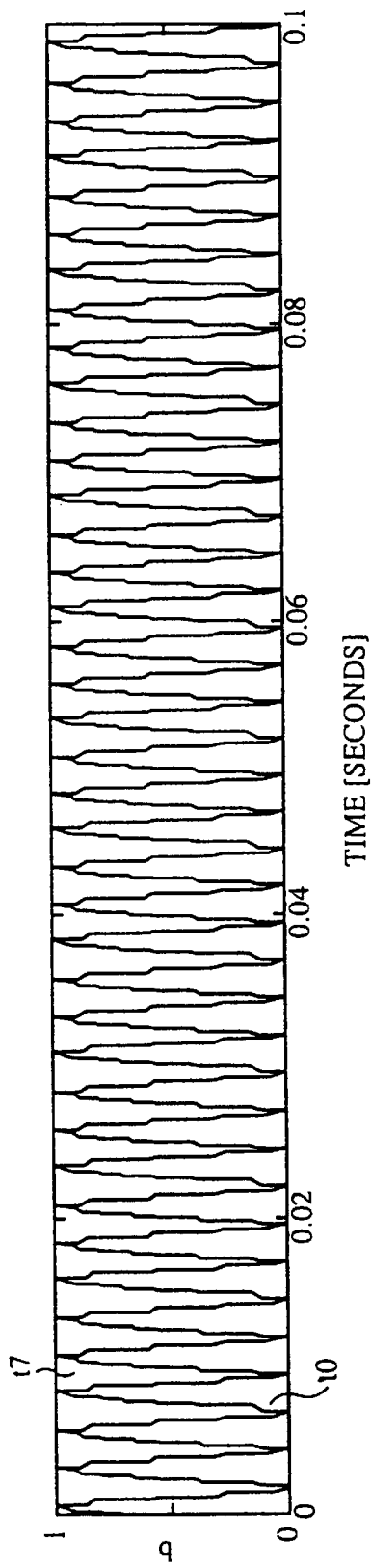
FIG. 2(a) is a graph showing the waveform of a time sharing signal for determining the time sharing between two zero-voltage vectors, whose value varies with time according to a sine-wave signal with a constant frequency.
Figure 2B:
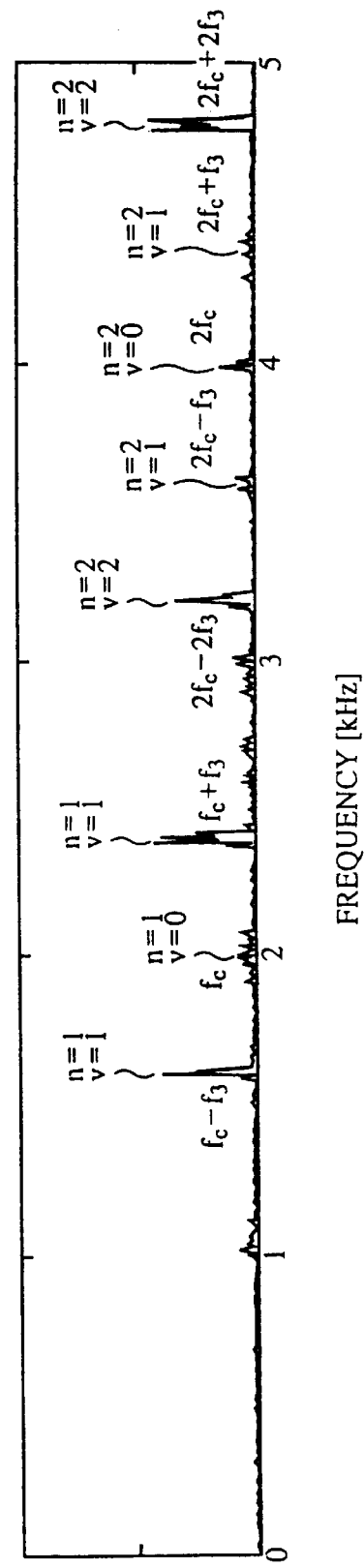
FIG. 2(b) is a graph showing the result of an FFT analysis of each of output line voltages when the value of the time sharing signal is varied as shown in FIG. 2(a)

Next, a description will be made as to the principle of PWM of voltage-vector-selection type or space vector type according to the present invention. Referring now to FIGS. 2(a) and 2(b), there are illustrated a graph showing the waveform of a time sharing signal whose value b is included in the equation (4), which was previously explained in Description of the Prior Art, and that is a sine-wave with a constant frequency, as shown in the following equation (6), and a graph showing an example of a result of Fourier transformation of each of output line voltages when the value b of the time sharing signal is varied according to the equation (6):

$$b=0.5\ (1+\sin 2\pi f_3 t) \quad (6)$$

where $f_3=400$ Hz. In addition, assume that the modulation factor k=0.16, the inverter frequency f=10Hz, and the carrier frequency fhd c=1/2T=2 kHz in the Fourier transformation of FIG. 2(b). As can be seen from FIG. 2(a), the value b of the time sharing signal sinusoidally varies between 0 and 1 at the frequency $f_3$. As can be seen from FIG. 2(b), high-frequency components included in each of the output line voltages have discrete frequencies. The discrete frequencies can be calculated and given by:

$$f_h = nf_c \pm mf \pm vf_3 \quad (7)$$

$$(n, m, v=1, 2, 3, \ldots)$$

where $f_h$ represents the frequencies of the high-frequency components of each of the output line voltages. Furthermore, each of the output line voltages has four high-frequency components having relatively large amplitudes, whose frequencies are $f_c \pm f_3$ and $2f_c \pm 2f_3$, as can be seen from FIG. 2(b).

Strictly speaking, each of those four high-frequency components can be divided into two high-frequency components having frequencies given by (the frequency of each of those four high-frequency components)±f or 2f. Since the inverter frequency f is small compared with the other frequencies $f_c$ and $f_3$, the inverter frequency f can be assumed to be zero. It is apparent from the above description that the frequencies or spectra of the high-frequency components included in each of the output line voltages are not spread out over a wide range of frequencies when the time sharing signal is sinusoidal with a constant frequency. It is also clear that varying the frequency $f_3$ of the time sharing signal can cause the frequencies of the high-frequency components to vary with time.

Figure 3A:
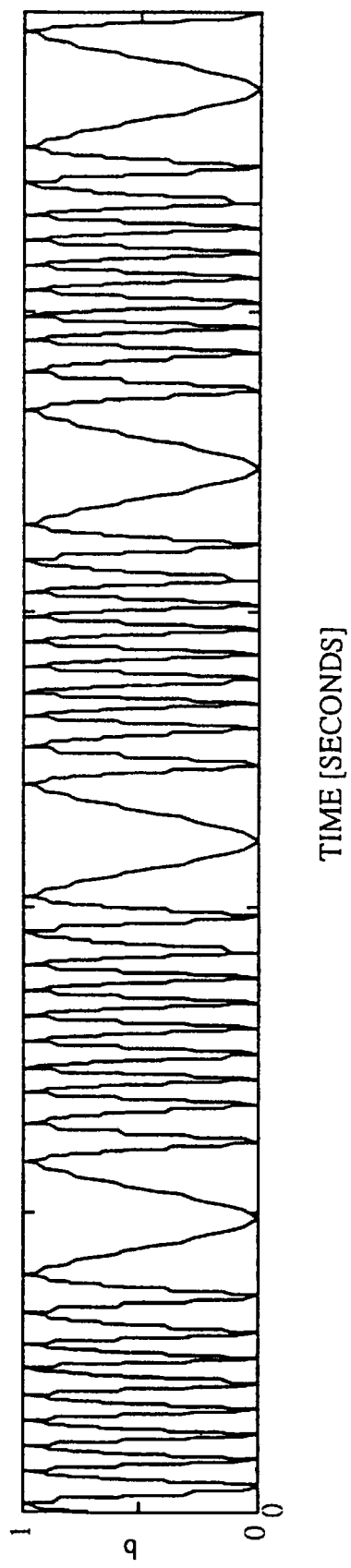
FIG. 3(a) is a graph showing the waveform of a time sharing signal for determining the time sharing between two zero-voltage vectors, whose value varies with time according to a sine-wave signal whose frequency varies sinusoidally with time.
Figure 3B:
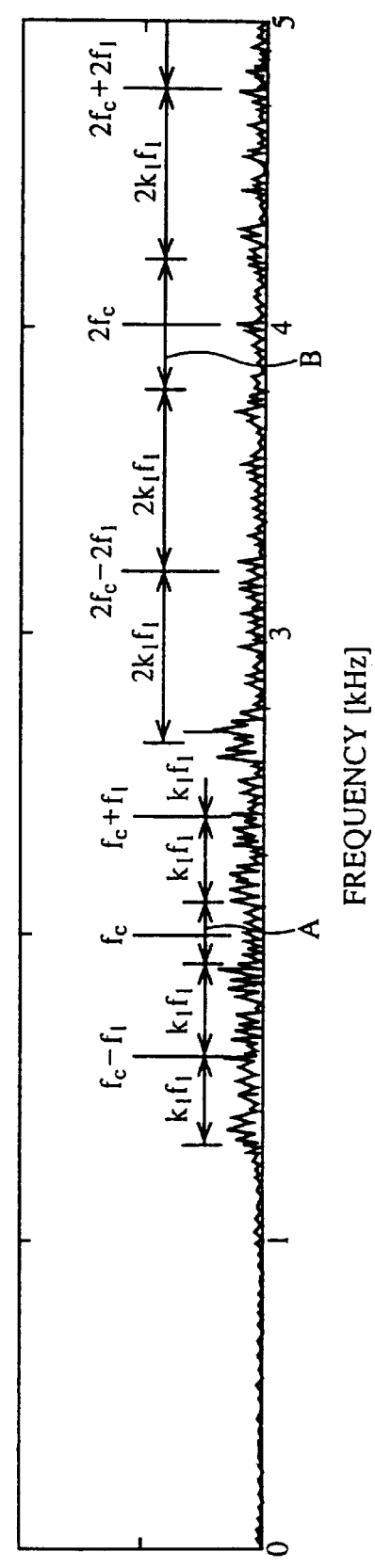
FIG. 3(b) is a graph showing the result of an FFT analysis of each of the output line voltages when the value of the time sharing signal is varied as shown in FIG. 3(a)

Referring next to FIGS. 3(a) and 3(b), there are illustrated a graph showing the waveform of the time sharing signal that is a sine-wave with a frequency that varies sinusoidally with time, as shown in the following equations (8), and a graph showing an example of the result of Fourier transformation of each of the output line voltages when the waveform of the time sharing signal is given by:

$$b=0.5\ (1+\sin 2\pi f_3 t)$$
$$f_3 = f_1(1+k_1 \sin 2\pi f_2 t) \quad (8)$$

In the Fourier transformation result as shown in FIG. 3(b), assume that the modulation factor k=0.16, the inverter frequency f=10 Hz, and the carrier frequency $f_c$=2 kHz, like in the Fourier transformation result as shown FIG. 2(b). Furthermore, it is assumed that $f_1$=400 Hz, $f_2$ =40Hz, and $k_1$=0.75. The frequency $f_3$ of the time sharing signal varies between $f_1(1-k_1)$ and $f_1(1+k_1)$ with time. Therefore, the frequencies $f_h$ of the high-frequency components included in each of the output line voltages are spread over a range of $-k_1 f_1$ to $+k_1 f_1$ with $(f_c + f_1)$ as the center of the range (i.e., a range of $\{(f_c+f_1)-k_1 f_1\}$ to $\{(f_c+f_1)+k_1 f_1\}$), a range of $-k_1 f_1$ to $+k_1 f_1$ with $(f_c-f_1)$ as the center of the range (i.e., a range of $\{(f_c-f_1)-k_1 f_1\}$ to $\{(f_c-f_1)+k_1 f_1\}$), a range of $-2k_1 f_1$ to $+2k_1 f_1$ with $(2f_c+2f_1)$ as the center of the range (i.e., a range of $\{(2f_c+2f_1)-2k_1 f_1\}$ to $\{(2f_c+2f_1)+2k_1 f_1\}$), and a range of $-2k_1 f_1$ to $+2k_1 f_1$ with $(2f_c-2f_1)$ as the center of the range (i.e., a range of $\{(2f_c-2f_1)-2k_1 f_1\}$ to $\{(2f_c-2f_1)+2k_1 f_1\}$). On the contrary, each of the output line voltages does not have any high-frequency components having frequencies which lie in the range A of $-f_1(1-k_1)$ to $+f_1(1-k_1)$ with $f_c$ as the center of the range and in the range B of $-2f_1(1-k_1)$ to $+2f_1(1-k_1)$ with $2f_c$ as the center of the range, as can be seen from FIG. 3(b).

Accordingly, it is possible to improve the tone quality of electromagnetic noise caused by an AC motor which is to be controlled by the PWM inverter apparatus of the first embodiment of the present invention by setting $f_c$, $f_1$, $f_2$, and $k_1$ so that the natural frequencies of the AC motor lie in the ranges A and B in which each of the output line voltages do not have any high-frequency components, and so that the frequencies or spectra of the high-frequency components included in each of the output line voltages are spread out over the widest possible range that does not include the natural frequencies of the AC motor. Although the frequency $f_2$ has no effect on the range over which the frequencies of the high-frequency components included in each of the output line voltages are spread out, it determines the speed at which the frequency $f_3$ determining the range varies.

Accordingly, the lower the frequency $f_2$, the narrower the range over which the frequencies of the high-frequency components included in each of the output line voltages are spread. As a result, users can become aware that the electromagnetic noise varies at the frequency $f_2$ and therefore became unbearable. To avoid causing such unbearable electromagnetic noise, it is desirable to set the frequency $f_2$ to a frequency that is equal to or greater than tens of Hz so that the electromagnetic noise that varies at the frequency $f_2$ can be heard as a continuous sound.

Figure 4:
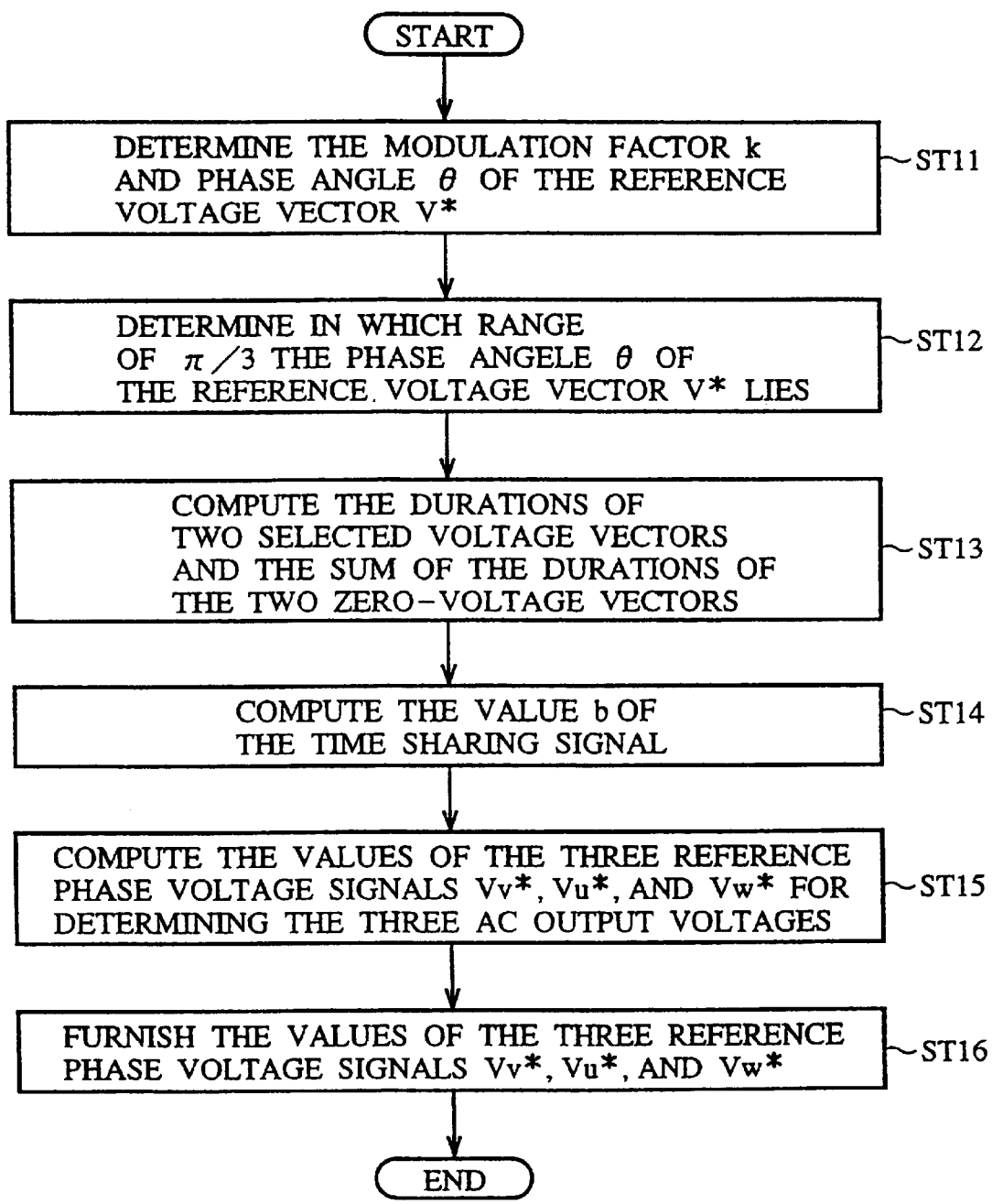
FIG. 4 is a flow diagram showing computational processing conducted by a microcomputer.

The PWM inverter apparatus according to the first embodiment of the present invention is so constructed as to spread the frequencies of high-frequency components included in each of the output voltages over a predetermined range of frequencies by using the PWM method of the present invention whose principle was mentioned above. Referring next to FIG. 4, there is illustrated a flow diagram showing computational processing conducted by the microcomputer 4. The microcomputer 4 carries out arithmetic operations, which will be explained below, in synchronization with a clock signal furnished by the carrier signal generating unit 3 and then furnishes three reference phase voltage signals Vu*, Vv*, and Vw* for setting the three AC output voltages Vu, Vv, and Vw respectively.

Figure 13:
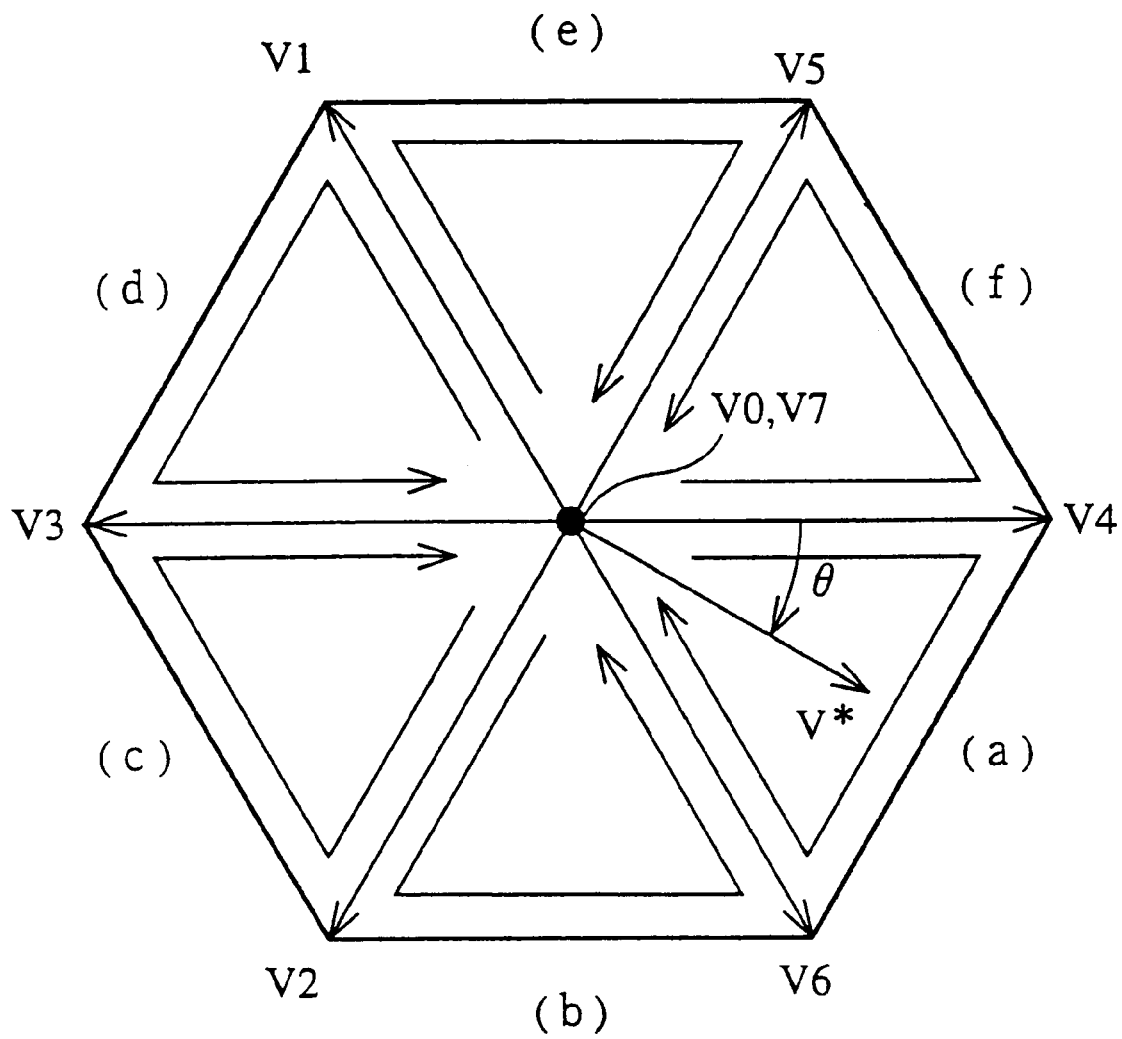
FIG. 13 is a diagram showing sequences of selection of voltage vectors.
Figure 14A:
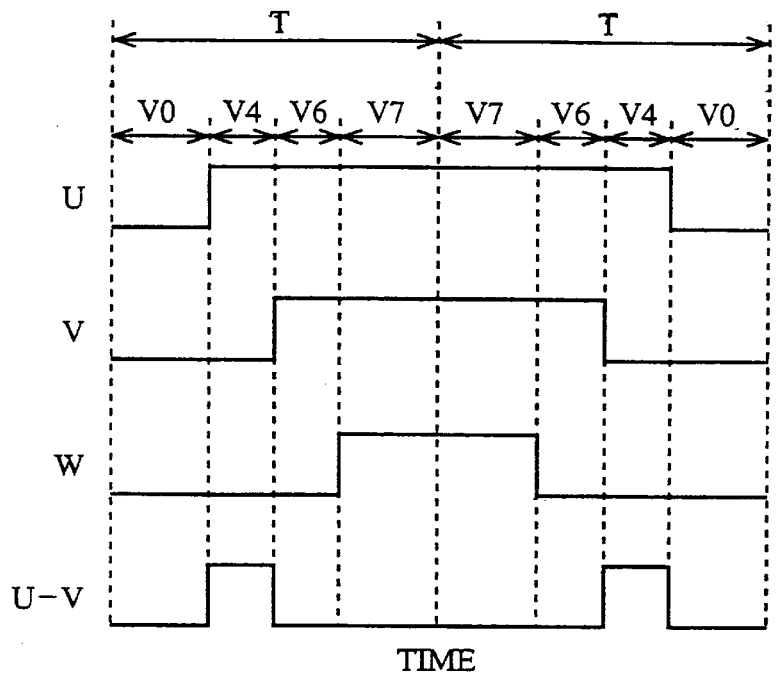
FIG. 14(a) is timing diagram showing an example of the waveforms of output voltages when the time sharing between two zero-voltage vectors V0 and V7 is maintained throughout all predetermined time periods.
Figure 14B:
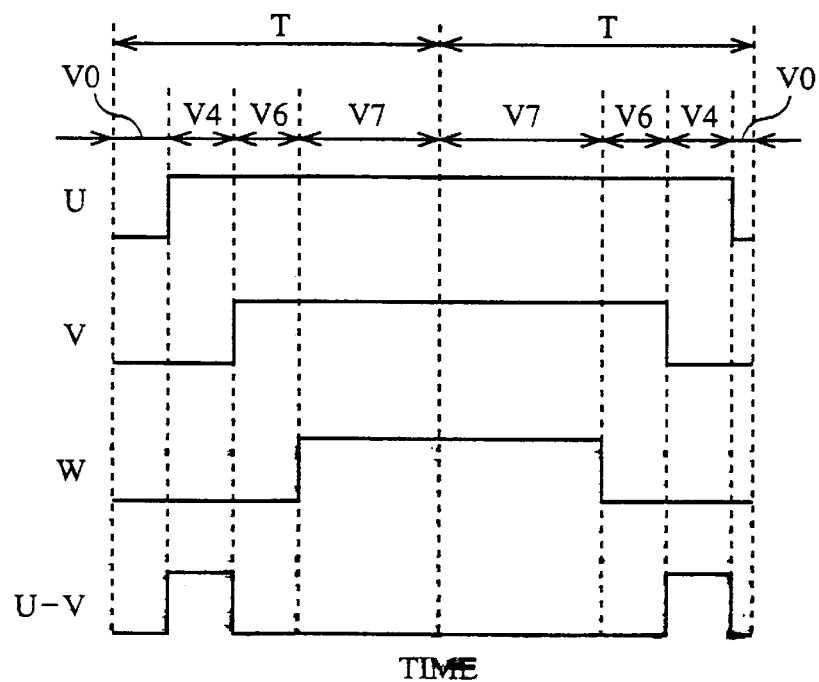
FIG. 14(b) is a timing diagram showing an example of the waveforms of output voltages when the time sharing between two zero-voltage vectors V0 and V7 is varied at predetermined time periods T.
Figure 16:
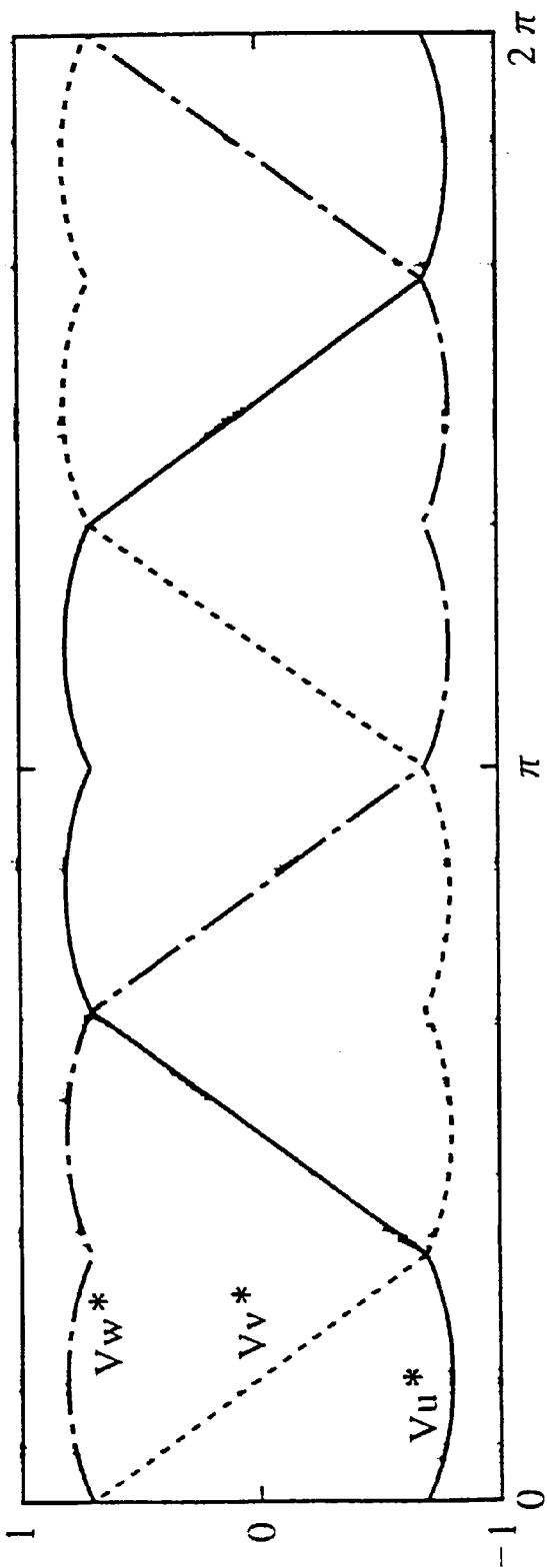
FIG. 16 is a graph showing an example of the waveforms of three reference phase voltage signals.

First, the microcomputer 4, in step ST11, accepts the modulation factor k and phase angle θ of the reference voltage vector V* which has been generated according to a reference frequency signal f applied to the apparatus from outside by the reference voltage vector generating unit 2. The microcomputer 4 then, in step ST12, divides the phase angle θ of the reference voltage vector v* by 60 degrees or π/3 and then determines in which triangular region with a phase angle range of π/3, as shown in FIG. 13, the reference voltage vector V* lies according to the quotient of the phase angle θ divided by π/3. Assuming that the quotient of the phase angle θ divided by π/3 defines the value of a region signal, the region signal can have any of six possible values, e.g., any one of the integers 0 to 5 according to the phase angle θ of the reference voltage vector V*. The six possible values respectively correspond to the triangular regions (a) to (f) of FIG. 13.

The microcomputer 4, in step ST13, computes the sum of the time durations of two zero-voltage vectors and the time durations of two selected voltage vectors using the equations (5). The microcomputer 4 then, in step ST14, computes the value b of the time sharing signal using the equations (8). Every time the microcomputer 4 carries out the processing as shown in the flow diagram of FIG. 4, a time interval of $1/f_{clk}$ elapses, where $f_{clk}$ represents the frequency of the clock signal from the carrier signal generating unit 3. Thus the microcomputer 4 carries out the arithmetic operation given by the equations (5) by actually calculating the value b of the time sharing signal using the following equations (9):

$$b=0.5(1+\sin θ3)$$

$$f_3=f_1(1+k_1 \sin θ2)$$

$$θ2=θ2 +2πf_2/f_{clk}$$

$$θ3=θ3+2πf_3/f_{clk} \qquad (9)$$

The microcomputer 4 advances to step ST15 wherein it computes the varying values of the three reference phase voltage signals Vu*, Vv*, and Vw* according to the table as shown in FIG. 15 by using the time durations of the two selected voltage vectors and the sum of the time durations of the zero-voltage vectors, which have been obtained in step ST3, and the value b of the time sharing signal, which has been obtained in step ST14.

The switching signal generating unit 5 compares the amplitudes of the three reference phase voltage signals Vu*, Vv*, and Vw* with that of the triangular carrier signal from the carrier signal generating unit 3, respectively, and then furnishes either an on signal or an off signal to each of the plurality of semiconductor switches of the three-phase inverter circuit 1 according to the comparison results. Each of the plurality of semiconductor switches of the three-phase inverter circuit 1 is turned on or off in response to the on or off signal from the switching signal generating unit 5. As a result, the PWM inverter apparatus of the first embodiment furnishes three AC output voltages and the averages of the instantaneous amplitudes for one pulse repetition period of the clock signal agree with the values of the reference phase voltage signals, respectively, by way of the output terminals 1u, 1v, and 1w.

As previously explained, the PWM inverter apparatus according to the first embodiment of the present invention can spread the frequencies of high-frequency components included in each of the output line voltages over the widest possible range which does not include the natural frequencies of an AC motor that is to be controlled by the PWM inverter apparatus by changing the timing of the generation of the output voltages without having to change the pulse widths of the output voltages which are determined by the pulse width modulation. Thereby, the tone quality of electromagnetic noise caused by the AC motor is improved so that the electromagnetic noise is bearable to users.

Second Embodiment

Referring next to FIG. 5, there is illustrated a block diagram showing the structure of a PWM inverter apparatus of triangular-wave-comparison type according to a second embodiment of the present invention. The PWM inverter apparatus of the second embodiment has the same structure as that of the first embodiment except that it does not include a voltage instruction generating unit, and except that the arithmetic operations performed by a microcomputer 4 differ from those preformed by the microcomputer of the first embodiment.

Figure 6A:
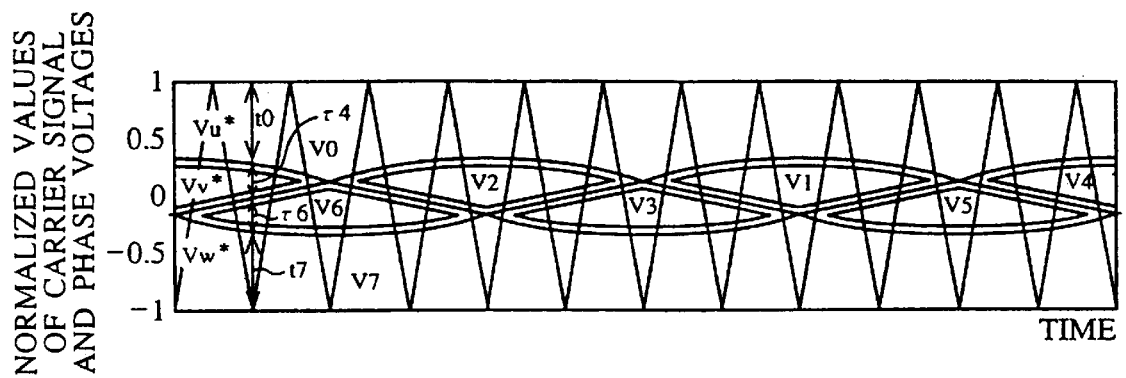
FIG. 6(a) is a graph showing the waveforms of a carrier signal and reference phase voltage signals.

Next, a description will be made as to the principle of a PWM method of triangular-wave-comparison type according to the second embodiment of the present invention. As shown in FIG. 6(a), pulse width modulation is performed by comparing the amplitudes of three sinusoidal reference phase voltage signals Vu*, vV*, and VW* with that of a triangular carrier signal C from a carrier signal generating unit 3. In this case, the following equation (10) is established:

$$Vu^*+Vv^*+Vw^*=0 \qquad (10)$$

In a general PWM inverter apparatus of triangular-wave-comparison type, sinusoidal signals with no DC components are used as the reference phase voltage signals so that each of the three output voltages has no zero-phase sequence component.

Figure 6B:
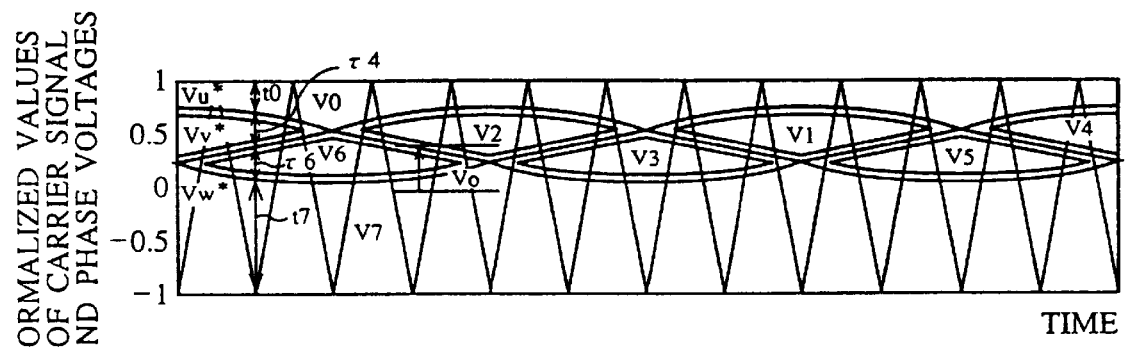
FIG. 6(b) is a graph showing the waveforms of a carrier signal and reference phase voltage signals generated in the PWM inverter apparatus according to the second embodiment of the present invention.

On the contrary, in order to change the timing of the generation of the output line voltages, the PWM method of triangular-wave-comparison type according to the second embodiment comprises the step of adding a DC voltage Vo to all the three reference phase voltage signals Vu*, Vv*, and Vw*, as shown in FIG. 6(b). In this case, although the relationship among Vu*, Vv*, and Vw* given by the equation (10) is not satisfied and therefore each of the output voltages can have a zero-phase sequence component, the values of the output line voltages are not varied. Each of the plurality of semiconductor switches of the three-phase inverter circuit switches between its on state and its off state at the time when the amplitude of the corresponding reference phase voltage signal agrees with that of the sinusoidal carrier signal. The timing of the generation of the output line voltage pulses is thus varied according to the value of the DC voltage Vo.

Figure 6C:
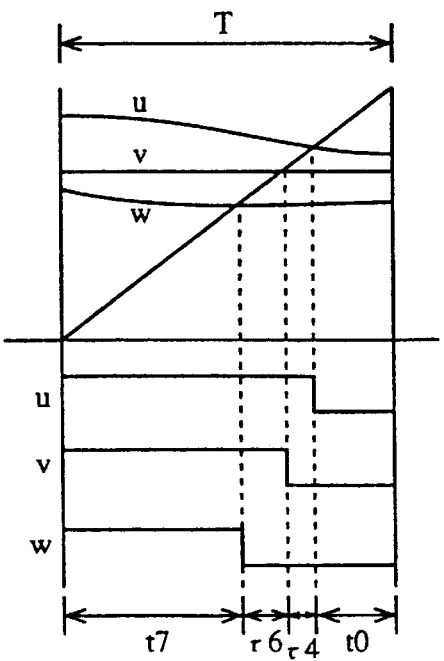
FIG. 6(c) is an enlarged part of FIG. 6(b)

It is clear by examining output voltage vectors furnished by the PWM inverter apparatus of triangular-wave-comparison type that all the voltage vectors are sequentially selected within a total period of time as shown in FIGS. 6(a) and 6(b). If a vertical line L is drawn in each of the graphs as shown in FIGS. 6(a) and 6(b) so that the vertical line L crosses the time axis at the same point in time, the ratios of the lengths of corresponding voltage vectors to the total length of the vertical line L are proportional to the ratios of the time durations of the corresponding voltage vectors, e.g., τ7, τ6, τ4, and t0, to one-half (or T) of the pulse repetition period of the carrier signal, as shown in a partially enlarged graph of FIG. 6(c). Accordingly, assuming that the twice the normalized maximum amplitudes of the carrier signal and reference phase voltage signals correspond to one-half of the pulse repetition period (or T) of the carrier signal, the length of part of the vertical line occupied by each voltage vector corresponds to its time duration. It is clear from the comparison between FIGS. 6(a) and 6(b) that the duration of the zero-voltage vector V7 increases and the duration of the zero-voltage vector V0 decreases with increase in the DC voltage Vo.

The sum τ0 of the time durations of the two zero-voltage vectors V0 and V7 furnished by the inverter circuit during one-half of the pulse repetition period of the carrier signal is given by the following equation:

$$\tau 0 = T - (\tau 4 + \tau 6) \tag{11}$$

where T represents one-half of the pulse repetition period of the carrier signal. If the maximum amplitudes of the carrier signal and three reference phase voltage signals are normalized to 1, respectively, the largest value Vo_max of the DC voltage Vo, which can be set each time sampling is done in synchronization with the carrier signal, is given by the following equation (12):

$$Vo\_max = 2 - (V\max - V\min) \tag{12}$$

where Vmax represents the largest one of the values of the reference phase voltage signals when the value of the DC voltage signal V0 is zero, and Vmin represents the smallest one of the values of the reference phase voltage signals when he value of the DC voltage signal Vo is zero.

The value of the DC voltage Vo is therefore calculated using the following equation (13):

$$Vo = 131 \; b \cdot Vo\_max - V\max \; (0 \leq b \leq 1) \tag{13}$$

The value b of the time snaring signal can be calculated using the equations (8). Thus the PWM inverter apparatus of the second embodiment can change the timing of the generation of the output line voltage pulses, like the PWM inverter apparatus of the aforementioned first embodiment.

Figure 7:
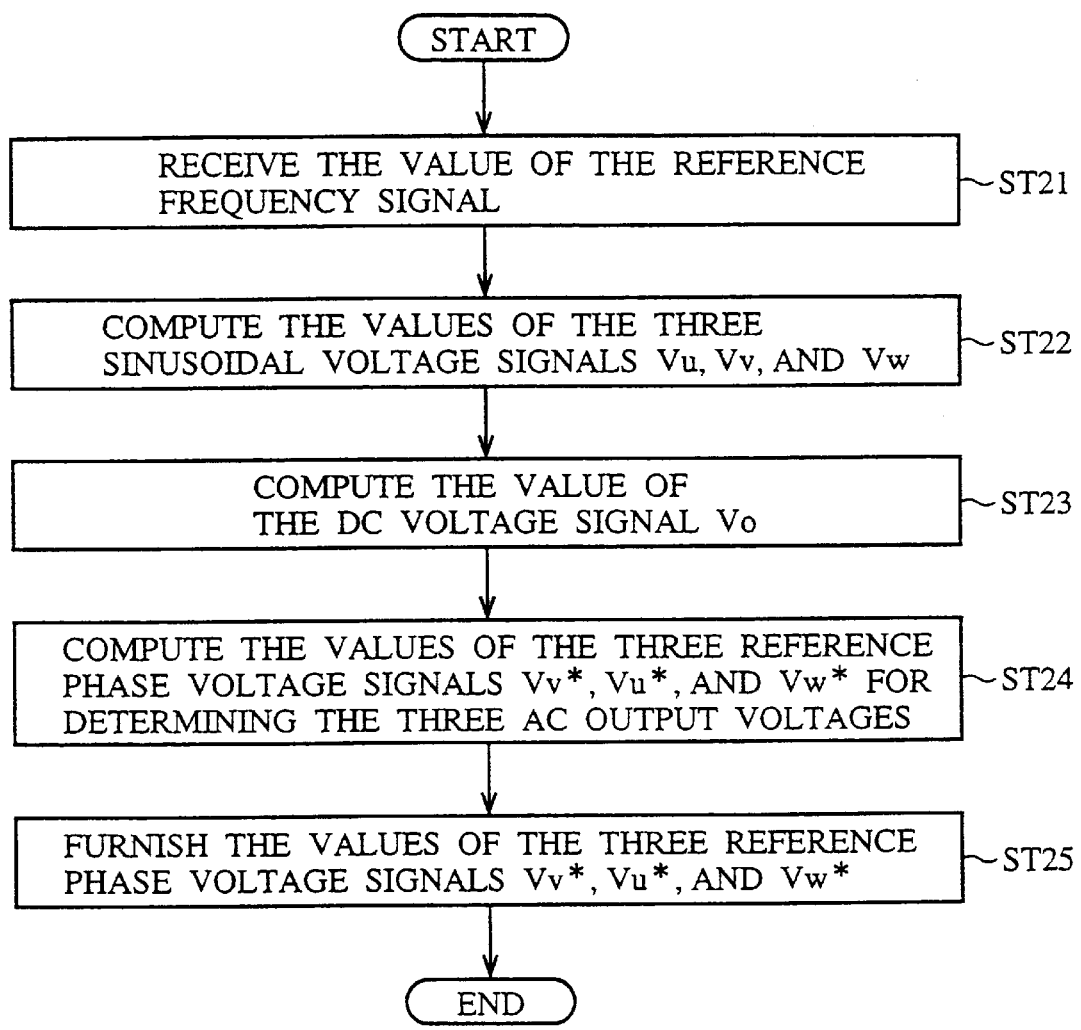
FIG. 7 is a flow diagram showing computational processing conducted by a microcomputer of the PWM inverter apparatus according to the second embodiment of the present invention.

The PWM inverter apparatus according to the second embodiment of the present invention is so constructed as to spread the frequencies of high—frequency components included in each of the output voltages over a predetermined range of frequencies by using the PWM method of the second embodiment of the present invention whose principle was mentioned above. Referring next to FIG. 7, there is illustrated a flow diagram showing computational processing conducted by the microcomputer 4. The microcomputer 4 carries out arithmetic operations which will be explained below in synchronization with a clock signal furnished by a carrier signal generating unit 3 and then furnishes three reference phase voltage signals Vu*, Vv*, and Vw* for setting the three AC output voltages that differ in phase.

First, the microcomputer 4, in step ST21, accepts a reference frequency signal f applied thereto. The microcomputer 4 then, in step ST22, computes the values of the three sinusoidal voltage signals Vu, Vv, and Vw with no DC component by using the following equations (14):

$$\theta = \theta + (2\pi f/f_{clk})$$

$$Vu = K_1 f \sin \theta$$

$$Vv = K_1 f \sin (\theta - 2\pi/3)$$

$$Vw = -(Vu + Vv) \tag{14}$$

The frequency $f_{clk}$ of the clock signal is included in the first equation $\theta = \theta + (2\pi f/f^{clk})$ for the reason that a time interval of $1/f_{clk}$ elapses every time the microcomputer 4 carries out the processing as shown in the flow diagram of FIG. 7, as previously mentioned.

The microcomputer 4 then, in step ST23, computes the value of the DC voltage signal Vo as follows: it computes the largest value Vo_max of the DC voltage signal Vo using the equation (12) first. In the case of a PWM inverter apparatus of triangular-wave-comparison type, the maximum possible amplitude of the sinusoidal phase voltages which can be furnished by the PWM inverter apparatus is equivalent to one-half (or E/2) of the voltage (or E) of a DC power supply disposed within the inverter circuit. In order to normalize the three sinusoidal voltage signals Vu, Vv, and Vw, the microcomputer divides their amplitudes by (E/2). As a result, the maximum possible amplitude of the sinusoidal voltage signals is normalized to 1. After that, the microcomputer 4 computes the value b of the time sharing signal by using the equations (9) and then computes the value of the DC voltage signal Vo by using the equation (13).

The microcomputer 4 then advances to step ST24 wherein it calculates the values of the three reference phase voltage signals Vu*, Vv*, and Vw* by using the following equations (15):

$$Vu^* = Vu + Vo$$

$$Vv^* = Vv + Vo$$

$$VW^* = VW + Vo \tag{15}$$

The microcomputer, in step ST25, furnishes those reference phase voltage signals to the switching signal generating unit 5.

The switching signal generating unit 5 compares the values of the three reference phase voltage signals Vu*, Vv*, and Vw* with that of the triangular carrier signal from the carrier signal generating unit 3, respectively, and then furnishes either an on signal or an off signal to each of the plurality of semiconductor switches of the three-phase inverter 1 according to the comparison results. Each of the plurality of semiconductor switches of the three-phase inverter 1 is turned on or off in response to the on or off signal from the switching signal generating unit 5. As a result, the PWM inverter apparatus of the second embodiment furnishes three AC output voltages. The averages of the instantaneous amplitudes for one pulse repetition period of the clock signal agree with the values of the reference phase voltage signals, respectively, by way of the output terminals 1u, 1v, and 1w.

As previously explained, in accordance with the second embodiment of the present invention, there is provided a PWM method suitable for PWM apparatuses of triangular-wave-comparison type, which can improve the tone quality of electromagnetic noise caused by an AC motor which is to be controlled by using the PWM method so that the electromagnetic noise is bearable to users.

Third Embodiment

In addition to the structure of either the first embodiment as shown in FIG. 1 or the second embodiment as shown in FIG. 5, a PWM inverter apparatus of a third embodiment is provided with a three-phase AC motor (not shown) connected to the output terminals 1u, 1v, and 1w of an inverter circuit 1, and an electromagnetic-noise measurement device (not shown), such as a noise meter, for measuring noise caused by the AC motor.

Natural frequencies of the AC motor can be measured by measuring electromagnetic noise caused by the AC motor as the carrier frequency is continuously changed, and by comparing the ratios of the amplitudes of the primary currents flowing through the AC motor measured simultaneously to the amplitudes of high-frequency components included in the noise. The reason why the primary currents are used instead of the output line voltages is that each of the primary currents includes higher-frequency components whose amplitudes are reduced compared with other high-frequency components because of an inductance of each primary winding of the AC motor, and it is therefore easy to measure the primary currents. The reduction in the amplitudes of the higher-frequency components included in each primary current presents no problem because the frequencies of components of electromagnetic noise caused by the AC motor, which correspond to those higher-frequency components of each primary current, are high.

Figure 8:
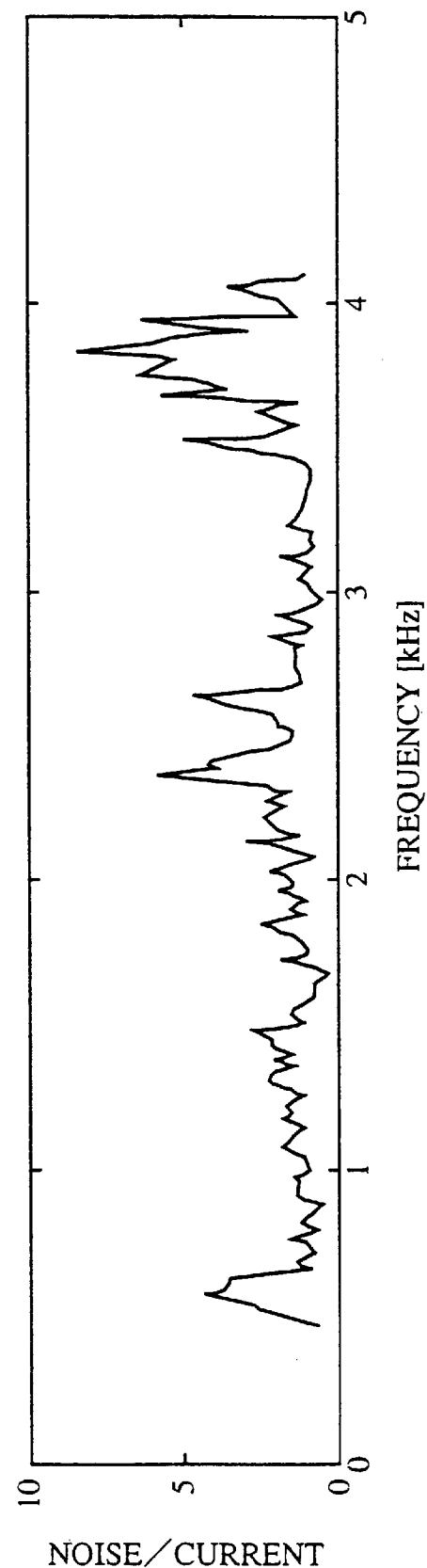
FIG. 8 is a graph showing natural frequencies of an AC motor of a PWM inverter apparatus according to a third embodiment of the present invention.
Figure 10:
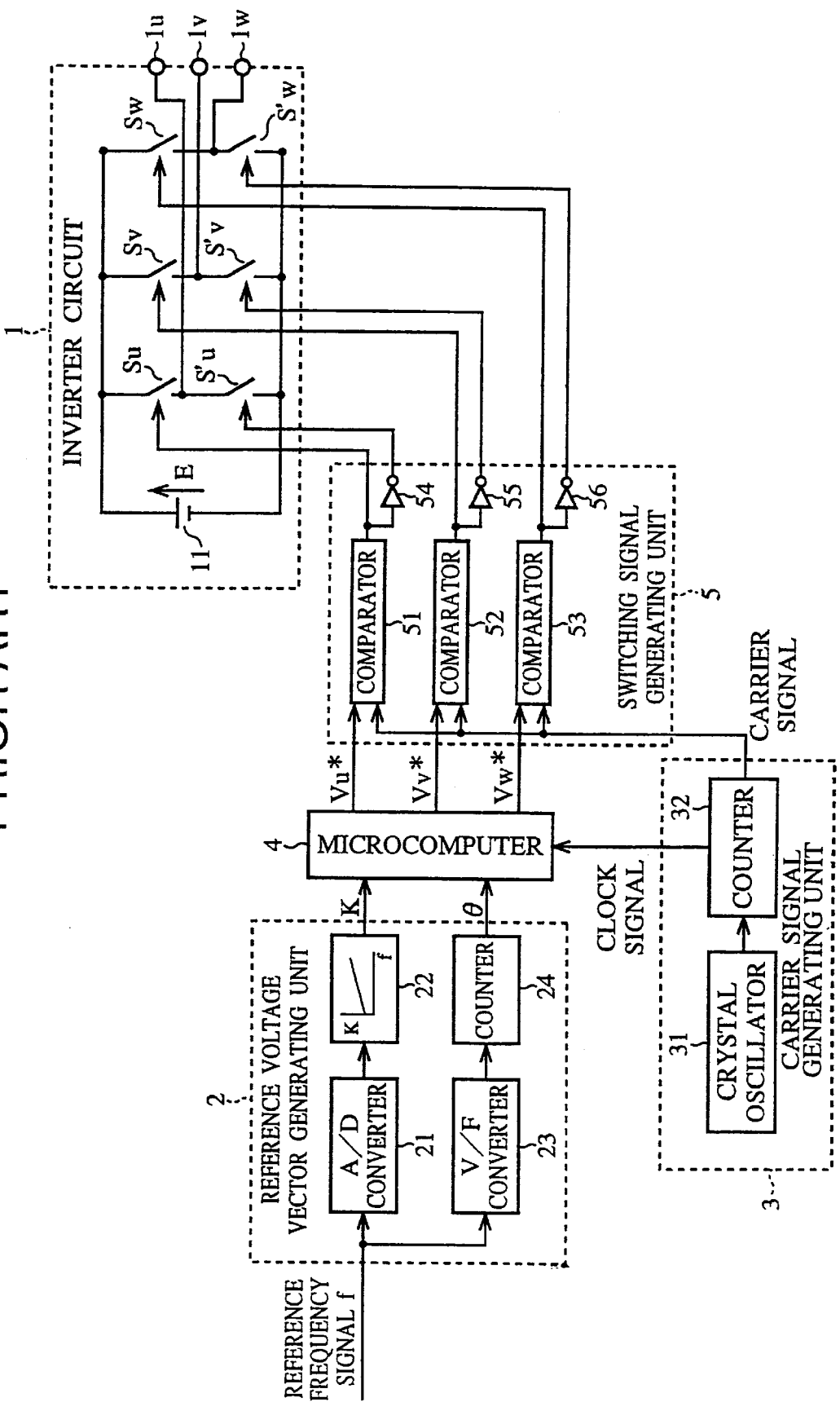
FIG. 10 is a schematic circuit diagram of a prior art PWM inverter apparatus.
Figure 11:
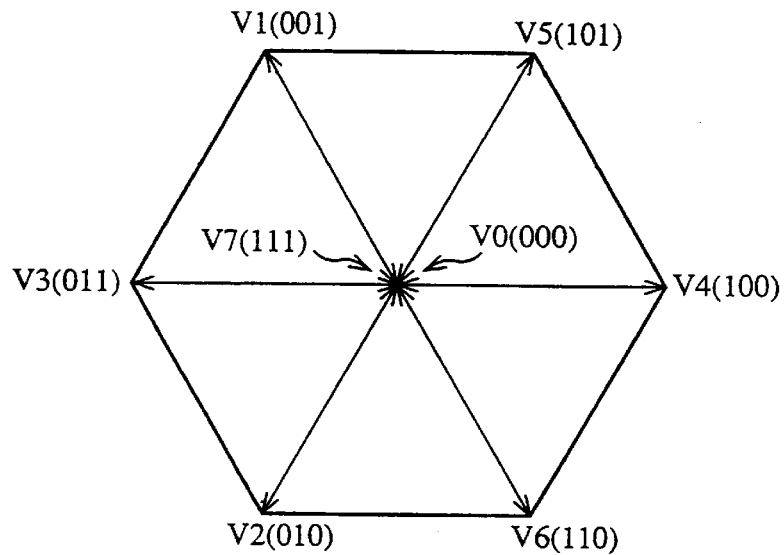
FIG. 11 is a diagram showing voltage vectors that can be furnished by an inverter circuit.
Figure 12:
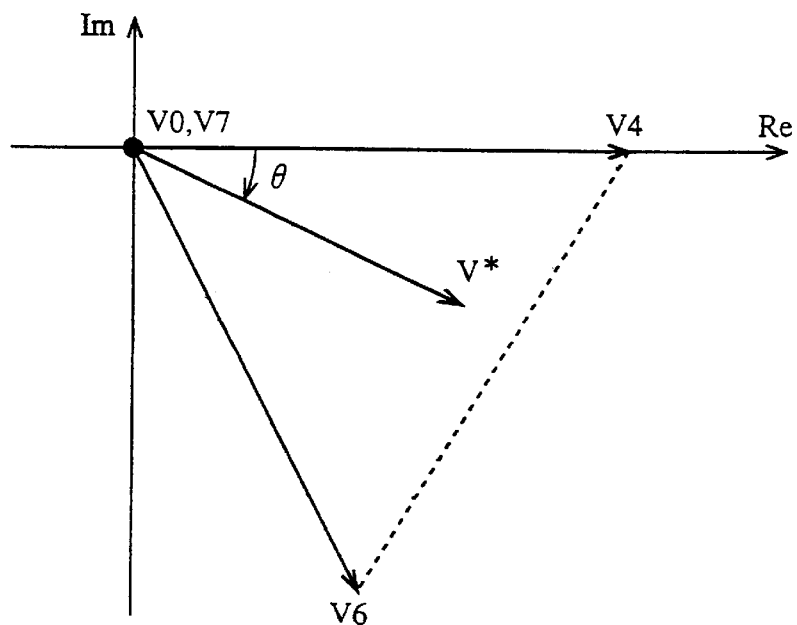
FIG. 12 is a diagram showing pulse width modulation of space vector type.

Referring next to FIG. 8, there is illustrated a graph showing the noise characteristic of a general-purpose 3.7 kW induction motor which was measured by using the method mentioned above. It is clear from the figure that the ratios of the amplitudes of high-frequency components of noise to those of high-frequency components of each primary current have peaks at about 0.8 kHz, 2.5 kHz, and 3.8 kHz, and those frequencies are equivalent to the natural frequencies of the induction motor. In order to spread the frequencies of high-frequency components included in each of the output line voltages over the widest possible range that does not include the natural frequencies of the induction motor, the parameters in the equations (5) used for calculating the value b of the time sharing signal are set as follows:

$$f_c=1.58\ kHz,\ f_1=365\ Hz,\ f_2=40\ Hz$$

$$k_t=0.86 \qquad (16)$$

Referring next to FIGS. 9(a) and 9(b), there are illustrated a graph showing a result of measurement of a primary current of the induction motor and a graph showing a result of measurement of noise caused by the induction motor when the parameters in the equations (5) used for calculating the value of the time sharing signal b are set according to the equations (16) and the induction motor is driven by the PWM inverter apparatus of the first embodiment. As can be seen from FIGS. 9(a) and 9(b), the primary current does not have any high-frequency component whose frequency is equivalent to any one of the natural frequencies of the inductor motor, and no electromagnetic noise component is therefore caused by the natural vibrations of the inductor motor. Furthermore, the measured noise does not have any high-frequency components with some peaks as shown in FIG. 8 and the magnitude of the noise is nearly flat over a wide range of frequencies.

As previously explained, the PWM inverter apparatus according to the third embodiment of the present invention can improve the tone quality of electromagnetic noise caused by an AC motor that is controlled by the PWM inverter apparatus more effectively by changing the timing of the generation of output line voltages so that the frequencies of high-frequency components included in each of the output line voltages are spread out over the widest possible range which does not include any component of a frequency which is equal to any one of frequencies of noise components included in the electromagnetic noise and caused by natural vibrations of the AC motor.

A variant may be made in the exemplary embodiments mentioned above. If the frequency $f_3$ is given by a function of time having a value in the range of $-k_1 f_1$ to $+k_1 f_1$ other than a sinusoidal function in the equations (8) used for computing the value b of the time sharing signal, the frequencies of high-frequency components of each of the AC output voltages are spread out over the same wide range. Thus the frequency $f_3$ can be computed by the following equation:

$$f_3=f_1[1+k_1 f(t)]$$

where f(t) is an arbitrary function of time such as a random number having a value in the range of −1 to +1. The variant can offer an advantage of being able to improve the tone quality of electromagnetic noise effectively, like the first through third embodiments mentioned above.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of controlling pulse width modulation (PWM) of a PWM-controlled inverter for generating AC output voltages for driving an electrical apparatus, the method comprising:

generating a reference voltage vector for setting AC output voltages; and changing times at which the AC output voltages are generated, during a period of time determined by a carrier signal, at intervals based on the carrier signal, without changing pulse widths of the AC output voltages produced in response to PWM control, so that a vector representing averages of instantaneous amplitudes of the AC output voltages for a period of time agrees with the reference voltage vector, and so that high-frequency components of each of the AC output voltages are spread over ranges of frequencies not including natural resonant frequencies of an electrical apparatus driven by the inverter.

2. The method according to claim 1, comprising measuring natural resonant frequencies in electromagnetic noise of an AC motor connected to and controlled by the inverter while varying the frequency of the carrier signal, and changing times at which the AC voltages are generated so that the ranges of frequencies do not include any high-frequency component having a frequency equal to a natural resonant frequency of the AC motor.

3. A device for controlling pulse width modulation (PWM) of a PWM-controlled inverter including a three-phase inverter circuit, the inverter circuit including three sets of first and second switching elements connected in series between positive and negative electrodes of a DC power supply and three output terminals, each of the three output terminals being connected to a respective point between said first and second switching elements of each of said three sets, for generating three AC output voltages from said DC power supply, said device comprising:

means for generating a carrier signal;

means for generating a reference voltage vector for setting three AC output voltages furnished by said three-phase inverter circuit;

means for determining a range of phase angles, the phase angle of the reference voltage vector lying at intervals determined by the carrier signal, and for selecting two voltage vectors corresponding to the range of phase angles from among a plurality of voltage vectors;

means for computing time durations of the two voltage vectors and for computing a sum of time durations of two zero-voltage vectors, so that a vector representing averages of instantaneous amplitudes of the three AC output voltages for a period of time agrees with the reference voltage vector;

means for computing a ratio of the time duration of one of the two zero-voltage vectors to the sum using a function of time such that the ratio varies with time and so that high-frequency components of each of the three AC output voltages are spread over ranges of frequencies not including natural resonant frequencies of an electrical apparatus driven by said three-phase inverter circuit, and for computing the time durations of the zero-voltage vectors using the ratio, and for generating three reference phase voltage signals according to the time durations of the two voltage vectors selected and the two zero-voltage vectors; and means for generating switching signals for driving said three sets of first and second switching elements of said three-phase inverter circuit according to the three reference phase voltage signals.

4. The device according to claim 3, wherein the function of time used for determining the ratio of the time duration of one of the two zero-voltage vectors to the sum of the time durations of the two zero-voltage vectors is a modulated sinusoidal function having a modulated, time varying frequency.

5. A device for controlling pulse width modulation (PWM) of a PWM-controlled inverter for generating AC output voltages, said device comprising:

means for generating a carrier signal;

means for generating sine-wave voltage signals without a DC component;

means for generating a DC voltage signal and for respectively adding the DC voltage signal to the sine-wave voltage signals to produce sums and to furnish the sums as reference phase voltage signals for setting the AC output voltages furnished by said PWM inverter; and means, responsive to the carrier signal, for generating switching signals for driving switching elements corresponding to the AC output voltages, respectively, according to the reference phase voltage signals.

6. The device according to claim 5, wherein the DC voltage signal has a value that varies in response to a sinusoidal signal having a frequency that varies with time.

* * * * *